March 31, 1959  J. H. SENG  2,879,853
TWO-WAY REVERSIBLE GROUND WORKING APPARATUS
Filed Oct. 25, 1955  3 Sheets-Sheet 2

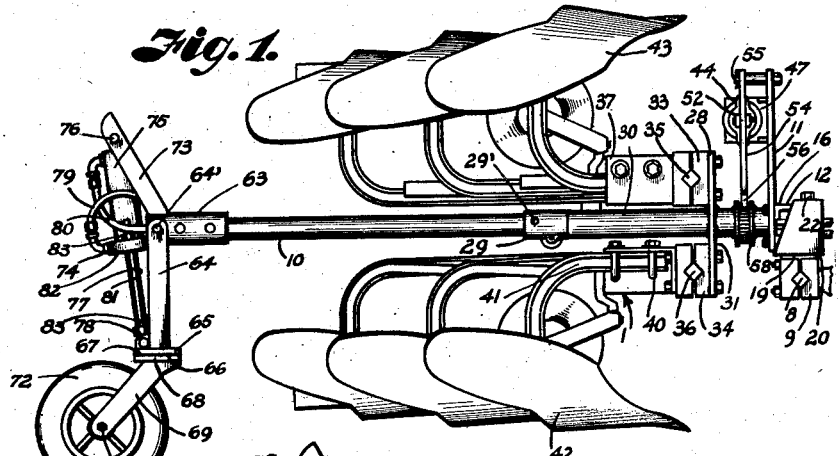

INVENTOR.
James H. Seng.
BY
Fishburn & Gold
ATTORNEYS.

March 31, 1959 J. H. SENG 2,879,853
TWO-WAY REVERSIBLE GROUND WORKING APPARATUS
Filed Oct. 25, 1955 3 Sheets-Sheet 3

INVENTOR.
James H. Seng.
BY
ATTORNEYS.

United States Patent Office 2,879,853
Patented Mar. 31, 1959

2,879,853

TWO-WAY REVERSIBLE GROUND WORKING APPARATUS

James Henry Seng, Salina, Kans.

Application October 25, 1955, Serial No. 542,565

4 Claims. (Cl. 172—226)

This invention relates to ground working apparatus such as agricultural implements and the like, and more particularly to a two-way reversible ground working implement wherein any two sets of ground working tools are universally mounted, adjusted and operated for reverse operation and adapted to be attached to a tractor and controlled therefrom.

The reverse or two-way operation of ground working tools, as for example two-way plows, has been found to be superior in the preparation of soil for seeding, particularly in irrigated areas for the reason that by the reverse operation the fields can be kept relatively more level and thereby avoid the additional expense of continously leveling the ground for irrigation farming. In two-way plowing, one gang of plows is employed while the implement is pulled across the field in one direction and then the implement is pulled in the other direction parallel to the furrow just completed with the other gang of plows in use whereby no trench is formed and the usual leveling operations subsequent to plowing are eliminated.

The objects of the present invention are to provide a two-way implement with two sets of ground working tools rotatably mounted on an axis longitudinally of the normal direction of travel of the implement with connection to a tractor or the like to provide for fore and aft rocking or tilting movement of the implement relative to the tractor and a free side-to-side swinging to compensate for any irregularity in the ground level over which the tractor and associated implement pass; to provide such an implement and connection to a tractor wherein pressure or implement lifting force or implement depressing force is applied to the implement; to provide a tail wheel swingably mounted on the rear portion of the implement for cooperation with the attachment connection to a tractor for supporting the implement and regulating the depth of the working of the ground; to provide such an implement wherein the tool mountings are laterally adjustable for various widths and various spacings of the tools and the tools longitudinally adjustable relative to the draft connection for equalizing the pull of the tools whereby they will tend to cause the tool to trail properly behind the tractor without lateral or sidewise drag; to provide hydraulic mechanism for rotating the implements with stops for quickly and easily determining the extent of rotation thereby; and to provide a novel, strong, two-way implement structure that is positively and easily controlled and manipulated for efficient ground working.

In accomplishing these and other objects of the present invention, I have provided improved details of structure, the preferred forms of which are illustrated in the accompanying drawings, wherein:

Fig. 1 is a side elevation of a two-way ground working implement with gangs of plows shown thereon.

Fig. 2 is a detail sectional view showing the tail wheel in raised position.

Fig. 3 is a rear elevation of the tail wheel and control thereof, portions being broken away to better illustrate the structure.

Fig. 4 is a detail respective view showing the connection of the implement to a tractor or the like.

Fig. 10 is a partial side elevation of modified form of tail wheel mounting.

Fig. 11 is an elevational view of the tail wheel in raised position relative to that shown in Fig. 10.

Referring more in detail to the drawings:

1 designates a two-way reversible implement adapted to be connected to a tractor having a power lift 2 thereon whereby operation of the power lift will raise and lower the forward end of the implement.

Figure 4:
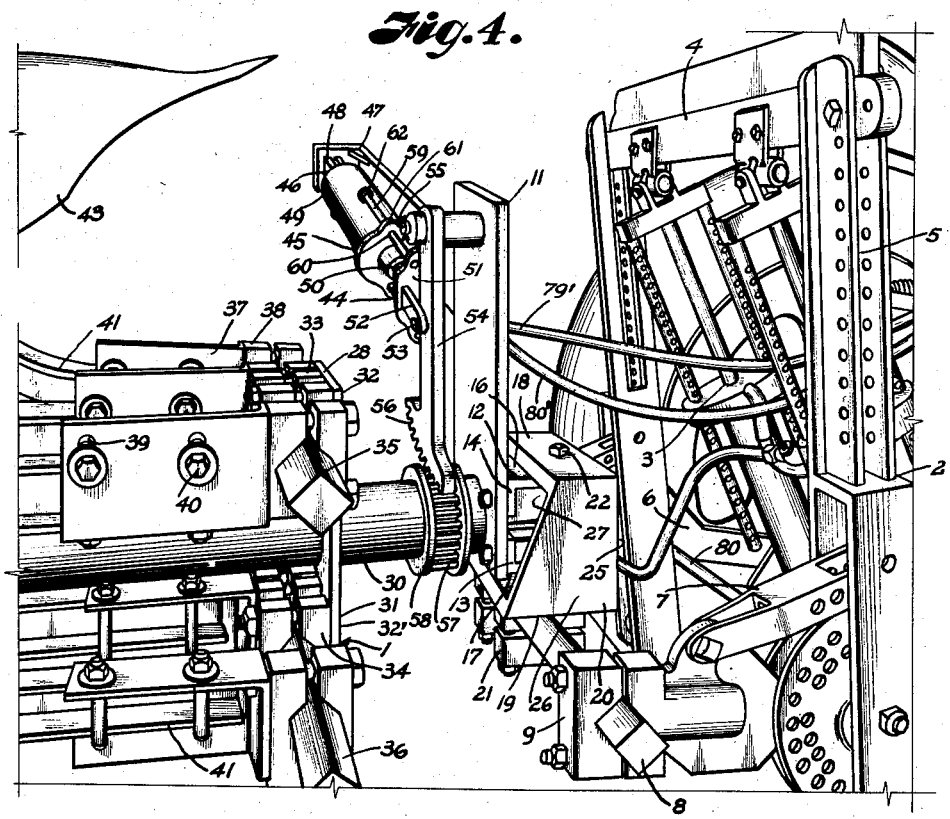
Figures 5, 6:
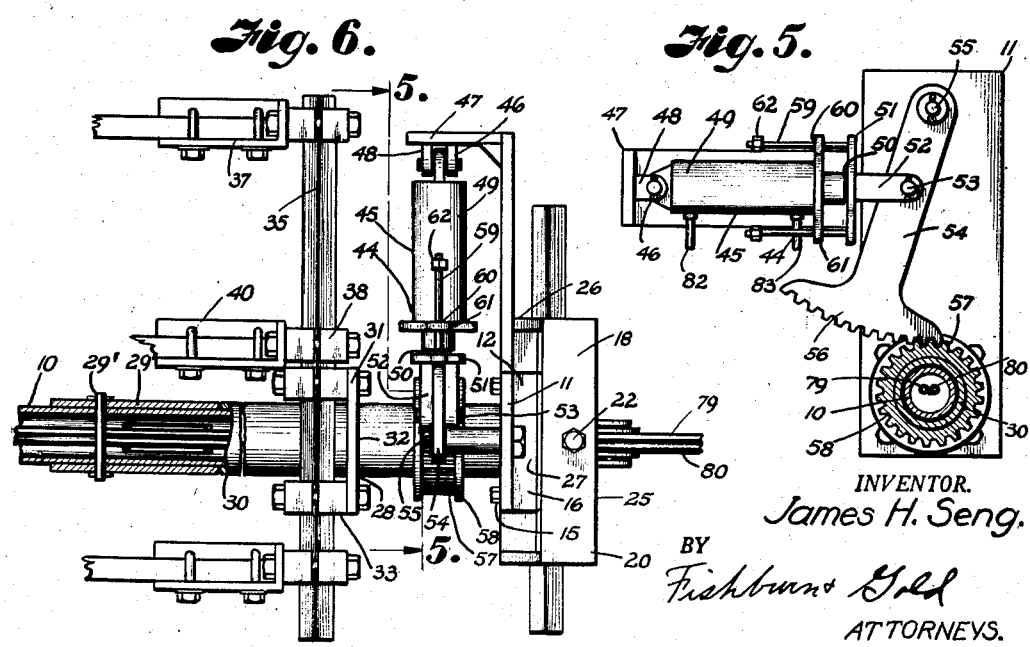
Fig. 5 is a transverse sectional view through the forward portion of the implement taken on the line 5—5, Fig. 6.
Fig. 6 is a plan view of the forward portion of the implement.
Figure 7:
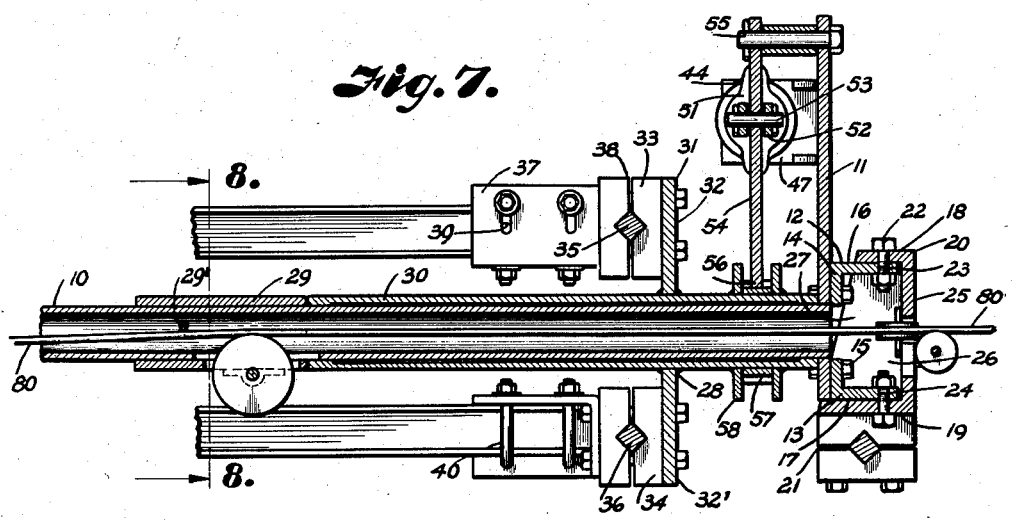
Fig. 7 is a longitudinal sectional view through the implement with a modified form of tail wheel control.
Figure 9:
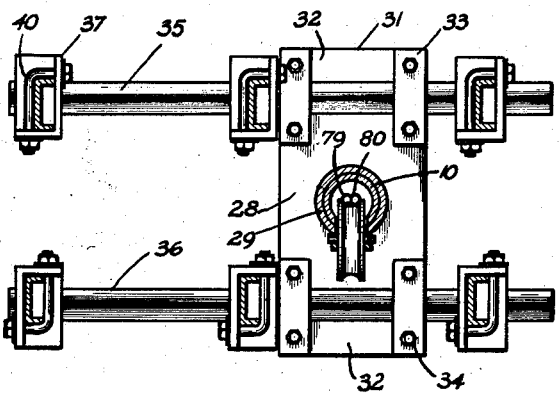
Fig. 9 is a front end view of the implement connection.
Figure 8:
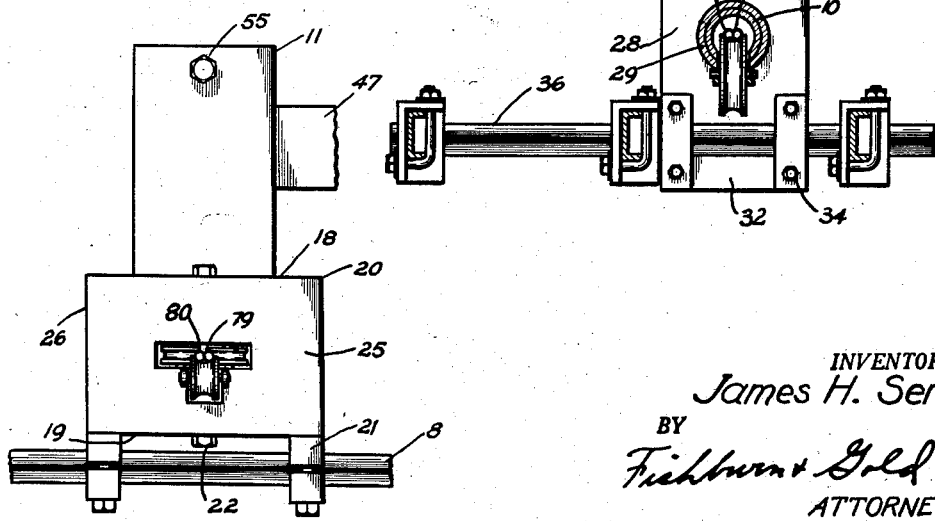
Fig. 8 is a vertical sectional view through the implement on the line 8—8, Fig. 7.

In the structure illustrated in Fig. 4, extensible hydraulic devices 3 are operatively connected to a transverse bar 4 which has struts 5 connected to the opposite ends thereof and depending therefrom. The lower ends of the struts are connected to trailing arms 6 swingable on the tractor with brace arms 7 connecting the rear portion of the arms 6 with the strut 5. A transverse tool bar 8 is secured to the rear portion of the arms 6 by means of suitable clamps 9, the extensible hydraulic devices, transverse bar, struts and arms being generally of the structure disclosed in my prior Patent No. 2,658,-438 issued November 10, 1953, on "Tractor Mounting for Agricultural Implements," wherein the trailing arms are each two piece with one swingable on the other for leveling adjustment of implements connected thereto. Operation of the extensible hydraulic device 3 selectively applies force to raise and lower the tool bar 8 in a swinging movement on the arms 6.

The two-way plow implement 1 includes an elongate beam 10 preferably tubular for lightness in weight and having a cylindrical surface. An upright plate 11 is suitably secured as by welding adjacent the forward end of the beam 10. The forward end of the beam 10 is arranged to provide a bifurcated tongue structure with vertically spaced upper and lower legs 12 and 13 extending forwardly from the plate 11. In the structure illustrated, the legs 12 and 13 are on angle-like structures with flanges 14 secured to the plate 11 by suitable fastening devices 15 whereby the upper face 16 of the leg 12 and lower face 17 of the leg 13 engage suitable faces such as the inner faces of a top wall 18 and bottom wall 19 of a housing 20 that is secured preferably by clamps 21 to the tool bar 8 whereby said housing is adjustable transversely of the tractor. Aligned pivot members 22 extend through aligned apertures 23 and 24 in the legs 12 and 13 and walls 18 and 19 to provide a pivotal connection between the beam 10 and tool bar 8 whereby the beam can swing only laterally about the pivot members 22. The housing 20 preferably has a forward wall 25 and side walls 26 and an open rear 27 to form a strong, pivotal mounting for the beam that will provide positive transmittal of raising and lowering forces to the beam and permit lateral swinging movement thereof. The housing 20 may be adjusted along the tool bar 8 for desired positioning for suitable trailing of the implement behind the tractor.

A carrier 28 is rotatably mounted on the beam 10 between the upright plate 11 and a removable collar 29 which is attached to the beam 10 by suitable fastening devices such as a pin 29' whereby the carrier is rotatable about the axis of the beam 10 and is substantially held against longitudinal movement thereon and longitudinal thrust of the carrier is transmitted to said beam.

In the illustrated structure, the carrier 28 consists of a sleeve 30 sleeved on the beam 10 with its rear end engaging the forward end of the collar 29 and its forward end engaging the rear face of the plate 11. A header plate 31 is suitably secured as by welding on the sleeve 30 in spaced relation to the forward end thereof and in operative position has a portion 32 extending above the sleeve and a portion 32' extending below the sleeve. Spaced clamps 33 are secured to the upper portion 32 and spaced clamps 34 are secured to the lower portion 32' of the carrier header and arranged to clamp transverse bars such as tool bars 35 and 36 respectively and mount same on the header whereby said bars extend substantially in parallel relation laterally to each side of the sleeve 30. A plurality of brackets 37 are secured to the bars 35 and 36 by means of clamps or other suitable fastening devices 38 whereby said brackets may be moved along the bars 35 and 36 for suitable spacing. The brackets 37 are illustrated as being elongate members angular in cross section and extending rearwardly of the bars 35 and 36 in parallel relation to the beam 10. The brackets 37 have slotted apertures 39 for receiving L-shaped bolts 40 adapted to cooperate with the angle shape of the brackets to clamp plow beams 41 therebetween whereby said plow beams 41 extend substantially longitudinally of the beam 10. Suitable ground working tools are secured to the beams 41, for example, a right hand plow share 42 is carried by each of the beams 41 secured to the brackets 37 on the bars 36 and left hand plow shares 43 are carried on beams 41 that are supported by the brackets 37 mounted on the bar 35. The connections of the plow beams 41 to the brackets 37 are each arranged whereby the beams 41 and plows thereon are adjustable longitudinally of the beam 10 and each plow may be moved forwardly or rearwardly relative to the other plows. This adjustment permits a variation of the leverage exerted on each plow whereby the lateral forces or sidewise drag are equalized and the plows trail properly behind the tractor. This longitudinal adjustment provides variation of forces tending to cause sidewise drag while maintaining proper lateral spacing of the plows.

Chisels, scoops, sweeps, disc plows and other ground working tools may be supported by the carrier and connected to the bars 35 and 36 by means of suitable brackets and clamps which obviously may vary in structure depending upon the particular arrangement of the tool and the draft beam or device therefor.

In the structure illustrated in Fig. 1, the right hand plow shares 42 are arranged in operative position below the longitudinal beam 10 and when it is desired to utilize the left hand plow shares 43 the carrier 28 is rotated through 180 degrees to arrange the right hand plow shares above the longitudinal beam 10 and the left hand plow shares below the beam and in operative position. The carrier rotating mechanism is generally designated 44 and consists of an extensible hydraulic member 45 having one end pivotally connected as at 46 to a member 47 that is stationary relative to the longitudinal beam 10, the other end of the extensible member being operatively connected to the carrier sleeve 30 to effect rotation of same.

In the illustrated structure, the member 47 is a lateral extension of the plate 11 and has ears 48 on which one end of an hydraulic cylinder 49 is pivotally mounted. A piston rod 50 extends from the other end of the cylinder and has an enlarged head 51 fixed thereon with spaced ears 52 extending from the head on the opposite side to the piston rod 50 and pivotally connected by a pin 53 to an arm 54 intermediate the ends thereof, one end of said arm 54 being pivotally mounted on a pin 55 supported by the upper end of a plate 11. The other end of the arm 54 has a gear segment 56 thereon which is operatively engaged with teeth 57 of a gear 58 fixed on the forward portion of the sleeve 30 whereby extension of the hydraulic extensible member 45 swings the arm 54 and rotates the sleeve 30 in one direction and contraction of the extensible member 45 swings the arm 54 in the opposite direction to rotate the sleeve 30 in the opposite direction.

The head 51 is preferably located on the piston rod 50 whereby when the extensible means is contracted the head will engage the ends of the cylinder 49 or other suitable stop limiting movement in that direction. Stop means is provided for limiting the extension of the extensible member to limit swinging movement of the arm 54 in the other direction, said stop means consisting of rods 59 each having one end secured to the head 51 and extending through apertures 60 and a flange 61 on the end of the cylinder 59 adjacent to the head, nuts 62 being threaded on the ends of the rods and adapted to engage the flange 61 to limit the extension of the hydraulic extensible member, said nuts forming an adjustment for varying the extent of rotation of the sleeve 30 whereby operation of the extensible member 45 and engagement of the stops will properly rotate and position the ground engaging tools.

A collar 63 is fixed to the rear portion of the beam 10 and spaced depending arms 64 are hingedly mounted thereon by means of a hinge pin 64' arranged transversely of the beam 10. The ends of the arms 64 remote from the hinge pins 64' are rigidly connected to a caster plate 65 which has a bearing face 66 engaged by the bearing face 67 of a plate 68 arranged at the upper ends of a wheel fork 69, a caster pin 70 pivotally mounting the plate 68 on the plate 65. The fork 69 extends rearwardly and downwardly from the ends of the arms 65 and carries an axle 71 that rotatably mounts a tail wheel 72 whereby the axle of the wheel is spaced from the axis of the pin 70 to provide a caster mounting for the wheel 72.

Arms 73 extend upwardly and rearwardly from the collar 63 and an hydraulic extensible member 74 operatively connects the arm 73 and the plate 65 whereby extension of the extensible member 74 swings the wheel and supporting structure therefor downwardly relative to the beam 10 and contraction of the extensible member swings the wheel and its mounting upwardly relative to the beam. The extensible member 74 preferably consists of an hydraulic cylinder 75 having one end pivotally mounted on a pin 76 carried by the arms 73 and a piston rod 77 extending from the other end and pivotally connected as at 78 to the plate 65. Fluid under pressure is supplied to the cylinder 75 by means of suitable hoses 79 and 80 connected to opposite ends of the cylinder and extending through the bore of the beam 10 to a suitable controlled source of fluid pressure (not shown) on the tractor. The cylinder 45 which controls rotary movement of the carrier is also connected to a source of fluid pressure with suitable controls on a tractor (not shown) by hose connections 79' and 80'. The extensible member 74 has suitable stops for limiting swinging movement of the wheel 72 and effecting desired elevational positioning of the rear of the beam 10. The stops consist of rods 81 having one end connected to the piston rod adjacent the pivotal connection 78 and extending through openings in the head 82 on the cylinder 75. Collars 83 are adjustably received on the rods 81 on each side of the head 82 whereby said collars engage said head to limit extension or contraction of the extensible member 74, and the wheel 72 may serve as an automatic gauge wheel which cooperates with the hitch and other adjustable members to aid in operation without overloading the tractor.

In the form of the invention illustrated in Figs. 10 and 11, the tail wheel 84 is carried on a fork 85 that is castered on a pin 86 mounted on the ends of arms 87 swingably mounted on the beam 10 by a pin 88 whereby a spring 89 having one end connected to a wheel fork extension 90 and the other end to a bracket 91 on the beam 10 urges the wheel upwardly. A cable 92 has one end connected as at 93 to the arms 87 and extends forwardly to the tractor whereby pull on the cable will swing the wheel 84 downwardly to raise the rear end of the beam 10 and release of the force on the cable allows the spring 89 to swing the wheel upwardly to lower the rear end of the beam 10.

While the forward end of the beam 10 is carried on the tool support or bar 8 on the lift mechanism on the tractor and is arranged to be bodily raised and lowered thereby, it has a pivotal connection with the hitch or drive connection on the tractor for lateral swinging movement only and the inclination is adjustable by the two piece arms 6. The caster wheel at the rear of the beam 10 aids in supporting the beam and ground working tools thereon and relieving the shock and forces that otherwise would have to be absorbed by the hydraulic lift mechanism on the tractor.

In operating a structure constructed and assembled as described, the tractor and implement are moved to an area to be worked and fluid pressure is applied to the cylinder 45 to swing the arm 54 to rotate the carrier 28 to position one set of ground working tools below the beam 10 in operating position. Then the extensible members 3 and extensible member 74 are contracted to lower the bar 8 and forward portion of the two-way reversible implement and also to raise the trailing wheel 72 and thereby lower the beam 10 to engage the ground working tools to the desired depth in the ground, the stops 83 and 62 and suitable stops on the hydraulic devices 3 being adjusted to provide said desired position. If there is sidewise drag on the implement the plow beams 41 are adjusted in the brackets 37 longitudinally of the beam 10 to equalize the lateral forces. When a pass across the area to be worked is completed, fluid pressure is applied to the extensible members 3 and 74 to raise the ground working tools from the ground and then fluid pressure is applied to the extensible member 45 to swing the arm 54 and rotate the carrier through substantially 180 degrees to position the other set of ground working tools in operative position. Then the tractor and implement are turned and fluid pressure applied to the extensible member 3 and the member 74 to lower the beam 10 and engage the other set of ground working tools in the ground and the tractor operated to draw the implement in a pass along side of the first pass. In turning movement of the tractor, the beam 10 swings on the pivot members 22 and the wheel 72 casters to provide suitable support for the rear end of the beam during such turning movement.

It is to be understood that while I have illustrated and described certain forms of my invention, it is not to be limited to the specific forms or arrangement of parts herein described and shown except insofar as such limitations are included in the claims.

What I claim and desire to secure by Letters Patent is:

1. In combination, a tractor having a power lift with spaced trailing arms swingable on the tractor, a longitudinal beam extending in the direction of normal travel of the tractor, rearward extensions swingable vertically on the trailing arms, means connecting the trailing arms and extensions for swinging the extensions on the trailing arms to adjust the relative inclination thereof, a transverse bar carried by the extensions on the trailing arms of the tractor power lift, means on the forward end of the longitudinal beam hingedly connecting said beam to the transverse bar for lateral swinging movement of said beam, a thrust collar fixed on the beam in spaced relation to the forward end of the beam, a carrier turnably mounted on the beam between the thrust collar and forward end of the beam, said carrier having ground working tools thereon angularly spaced substantially one-half revolution apart, means fixed relative to the forward end of the beam and operatively connected to the carrier for turning said carrier about an axis extending longitudinally of the beam to bring either ground working tool into operative position, a single rear supporting wheel at the rear of the longitudinal beam, rearwardly extending arms pivotally mounted on said beam for swinging movement in a vertical plane, means castering the rear supporting wheel on said rearwardly extending arms, and means connected to said wheel carrying arms for raising and lowering said wheel relative to the beam.

2. In combination, a tractor having a power lift with spaced trailing arms swingable on the tractor, a longitudinal beam extending in the direction of normal travel of the tractor, rearward extensions vertically swingable on the trailing arms, means connecting the trailing arms and extensions for swinging the extensions on the trailing arms to adjust the relative inclination thereof, a transverse bar carried by the extensions of the trailing arms of the tractor power lift and raised and lowered in response to operation thereof, a housing secured to the transverse bar and having vertically spaced walls with substantially parallel adjacent surfaces, means on the forward end of the longitudinal beam having vertically spaced surfaces engaging the spaced surfaces of the housing, hinge means hingedly connecting said means on the forward end of the beam to the housing for lateral swinging movement only of said beam, a carrier turnably mounted on the forward portion of the beam, said carrier having a right hand ground working tool and a left hand ground working tool angularly spaced substantially one-half revolution apart, an hydraulic extensible means having one end fixed relative to the means on the forward end of the beam and the other end operatively connected to the carrier for rotating the carrier in response to extension and contraction of the extensible member for turning said carrier about an axis extending longitudinally of the beam to bring either ground working tool into operative position, a rear supporting wheel swingably mounted on the rear portion of the beam, and means connected to said wheel mounting for raising and lowering the rear supporting wheel for cooperation with the power lift in supporting the beam and carrier for regulating the working depth of the tools on the carrier.

3. In combination, a tractor having a power lift with spaced trailing arms swingable on the tractor, a longitudinal beam extending in the direction of normal travel of the tractor, a transverse bar carried by the trailing arms of the tractor power lift and raised and lowered in response to operation thereof, a housing secured to the transverse bar and having vertically spaced walls with substantially parallel adjacent surfaces, means on the forward end of the longitudinal beam having vertically spaced surfaces engaging the spaced surfaces of the housing, hinge means hingedly connecting said means on the forward end of the beam to the housing for lateral swinging movement only of said beam, a thrust collar fixed on the beam in spaced relation to the forward end thereof, a carrier turnably mounted on the beam between the thrust collar and forward end of the beam, said carrier having a right hand plow and a left hand plow angularly spaced substantially one-half revolution apart, a gear on the carrier coaxially of the beam, an arm having one end pivotally mounted on an axis spaced from the axis of the beam, a bracket fixed relative to the beam and pivotally mounting said arm, a gear segment on the arm operatively engaged with the gear on the carrier, an hydraulic extensible means having one end fixed relative to the bracket and the other end connected to the arm for swinging said arm and rotating the carrier in response to extension and contraction of the extensible member for turning said carrier about an axis extending longitudinally of the beam to bring either plow into operative position, a single rear supporting wheel at the rear of the longitudinally beam, trailing arms swingably mounted on the rear portion of the beam, means mounting the single rear supporting wheel on the trailing arms for castered movement of said wheel, and power means connected to said arms for raising and lowering the rear supporting wheel for cooperation with the power lift and supporting the beam and carrier for regulating the working depth of the plows on the carrier.

4. In combination, a tractor having a power lift with spaced trailing arms swingable on the tractor, a longitudinal beam extending in the direction of normal travel of the tractor, a transverse bar carried by the trailing arms of the tractor power lift and raised and lowered in response to operation thereof, a housing secured to the transverse bar and having vertically spaced walls with substantially parallel adjacent surfaces, means on the forward end of the longitudinal beam having vertically spaced surfaces engaging the spaced surfaces of the housing, hinge means hingedly connecting said means on the forward end of the beam to the housing for lateral swinging movement only of said beam, a thrust collar fixed on the beam in spaced relation to the forward end thereof, a carrier turnably mounted on the beam between the thrust collar and forward end of the beam, spaced laterally extending bars on said carrier, said laterally extending bars being arranged one above and one below the axis of the longitudinal beam, a plurality of right hand plows and left hand plows having shanks extending longitudinally and substantially parallel to the longitudinal beam, means adjustably connecting each of the plow shanks of the right hand plows to one laterally extending bar and the shanks of the left hand plows to the other laterally extending bar for adjustment of the position of the respective plows longitudinally of the longitudinal beam, said right hand plows and left hand plows being angularly spaced substantially one-half revolution apart, a gear on the carrier coaxially of the beam, an arm having one end pivotally mounted on an axis spaced from the axis of the beam, a bracket fixed relative to the beam and pivotally mounting said arm, a gear segment on the arm operatively engaged with the gear on the carrier, an hydraulic extensible means having one end fixed relative to the bracket and the other end connected to the arm for swinging said arm and rotating the carrier in response to extension and contraction of the extensible member for turning said carrier about an axis extending longitudinally of the beam to bring either plow into operative position, adjustable stop means associated with the hydraulic extensible means for limiting turning movement of the carrier and angular relationship of the plows relative to the transverse bar, a single rear supporting wheel at the rear of the longitudinal beam, trailing arms swingably mounted on the rear portion of the beam, means mounting the single rear supporting wheel on the trailing arms for castered movement of said wheel, power means connected to said arms for raising and lowering the rear supporting wheel for cooperation with the power lift and supporting the beam and carrier for regulating the working depth of the plows on the carrier, and adjustable stop means associated with the power means for limiting raising and lowering movement of the rear supporting wheel.

References Cited in the file of this patent

UNITED STATES PATENTS

| | | |
|---|---|---|
| 1,427,677 | Culbertson | Aug. 29, 1922 |
| 2,429,463 | Hurlimann | Oct. 21, 1947 |
| 2,658,438 | Seng | Nov. 10, 1953 |
| 2,659,284 | Pursche | Nov. 17, 1953 |
| 2,713,296 | Silver | July 19, 1955 |
| 2,788,727 | Bonnel | Apr. 16, 1957 |

FOREIGN PATENTS

| | | |
|---|---|---|
| 1,073,979 | France | Mar. 31, 1954 |
| 1,088,573 | France | Sept. 15, 1954 |